US012730855B2

(12) United States Patent
Zhong et al.

(10) Patent No.: US 12,730,855 B2
(45) Date of Patent: Sep. 8, 2026

(54) DIRECTED GRAPH LAYOUT METHOD AND APPARATUS, ELECTRONIC DEVICE, AND STORAGE MEDIUM

(71) Applicant: Beijing Volcano Engine Technology Co., Ltd., Beijing (CN)

(72) Inventors: Fahai Zhong, Beijing (CN); Yilin Qiu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/962,503

(22) Filed: Nov. 27, 2024

(65) Prior Publication Data

US 2025/0181666 A1 Jun. 5, 2025

(30) Foreign Application Priority Data

Nov. 30, 2023 (CN) ........................ 202311623330.1

(51) Int. Cl.
*G06F 17/10* (2006.01)
*G06F 16/901* (2019.01)

(52) U.S. Cl.
CPC .......... *G06F 17/10* (2013.01); *G06F 16/9024* (2019.01)

(58) Field of Classification Search
CPC .. G06F 17/10; G06F 16/9024; G06F 16/9027; G06F 1/03; G06F 7/544; G06T 11/206; G06T 11/26

(Continued)

(56) References Cited

U.S. PATENT DOCUMENTS 7,714,862 B1 * 5/2010 Dwyer .................. G06T 11/206 345/441
8,237,716 B2 * 8/2012 Kolipaka ................ G06T 11/26 345/419

(Continued)

FOREIGN PATENT DOCUMENTS

CN 102279874 A 12/2011
CN 112836041 A 5/2021

(Continued)

OTHER PUBLICATIONS

Ge, M. et al., "System Modeling (2nd Edition)," National Defense Industry Press, Apr. 29, 2026, 9 pages.

(Continued)

*Primary Examiner* — Hosain T Alam
(74) *Attorney, Agent, or Firm* — Alleman Hall LLP

(57) ABSTRACT

The present disclosure relates to the field of data visualization technologies, and discloses a directed graph layout method and apparatus, an electronic device, and a storage medium. The present disclosure provides a directed graph layout method, including: obtaining graph data to be used for directed graph layout; determining an optimal node hierarchy corresponding to each node based on the connection relationships of the plurality of nodes; obtaining a target node whose node hierarchy is to be adjusted and a target node hierarchy corresponding to the target node, and using the target node hierarchy as the optimal node hierarchy corresponding to the target node; and determining a target directed layout graph of the graph data based on the target node hierarchy corresponding to the target node and the optimal node hierarchies corresponding to other nodes.

17 Claims, 7 Drawing Sheets

(58) Field of Classification Search
USPC .......................................................... 707/798
See application file for complete search history.

(56) References Cited

U.S. PATENT DOCUMENTS

| | | | | |
|---|---|---|---|---|
| 2005/0138057 | A1* | 6/2005 | Bender | G06F 9/451 707/999.102 |
| 2008/0246769 | A1* | 10/2008 | Milov | G06F 30/39 345/440 |
| 2010/0073375 | A1* | 3/2010 | Breeds | G06T 17/00 345/440 |
| 2010/0274818 | A1* | 10/2010 | Chauvin | G06F 16/9024 707/E17.055 |
| 2011/0134926 | A1* | 6/2011 | Winternitz | H04L 45/02 370/400 |
| 2020/0044939 | A1* | 2/2020 | Xia | H04L 41/22 |
| 2021/0157461 | A1* | 5/2021 | Ellsworth | G06F 16/26 |
| 2023/0145348 | A1* | 5/2023 | Waddingham | G06F 16/9024 707/798 |
| 2025/0315480 | A1* | 10/2025 | Qiu | G06F 16/9024 |

FOREIGN PATENT DOCUMENTS

| | | | | |
|---|---|---|---|---|
| CN | 113837382 | A | * 12/2021 | G06N 3/045 |
| CN | 115017367 | A | * 9/2022 | G06F 16/9024 |
| CN | 115934980 | A | * 4/2023 | |
| CN | 116095089 | A | * 5/2023 | |
| CN | 116628290 | A | * 8/2023 | G06F 16/9024 |
| CN | 117473123 | A | * 1/2024 | |
| CN | 117493616 | A | * 2/2024 | G06F 16/9024 |

OTHER PUBLICATIONS

China National Intellectual Property Administration, Search Report Issued in Application No. 2023116233301, May 8, 2026, 4 pages.

* cited by examiner

S401: Obtain graph data to be used for directed graph layout

S402: Respectively determine an optimal node hierarchy corresponding to each node based on the connection relationships of the plurality of nodes

S403:

S4031: Determine the target node whose hierarchy is to be adjusted of the plurality of nodes according to a received hierarchy adjustment instruction S4032: Switch the optimal node hierarchy corresponding to the target node to the target node hierarchy, to respond to the hierarchy adjustment instruction

S404:

S4041: Detect whether the optimal node hierarchy corresponding to the other node is the same as the target node hierarchy S4042: In response to an optimal node hierarchy corresponding to the other node being the same as the target node hierarchy, determine a next node hierarchy of the target node hierarchy as the optimal node hierarchy corresponding to the other node S4043: Determine an initial node coordinate of each node in a corresponding optimal node hierarchy based on the optimal node hierarchy corresponding to each node and the connection relationships of the plurality of nodes S4044: Detect a layout relationship between the plurality of nodes, and obtain the target directed layout graph of the graph data by adjusting the initial node coordinate of the node based on the layout relationship

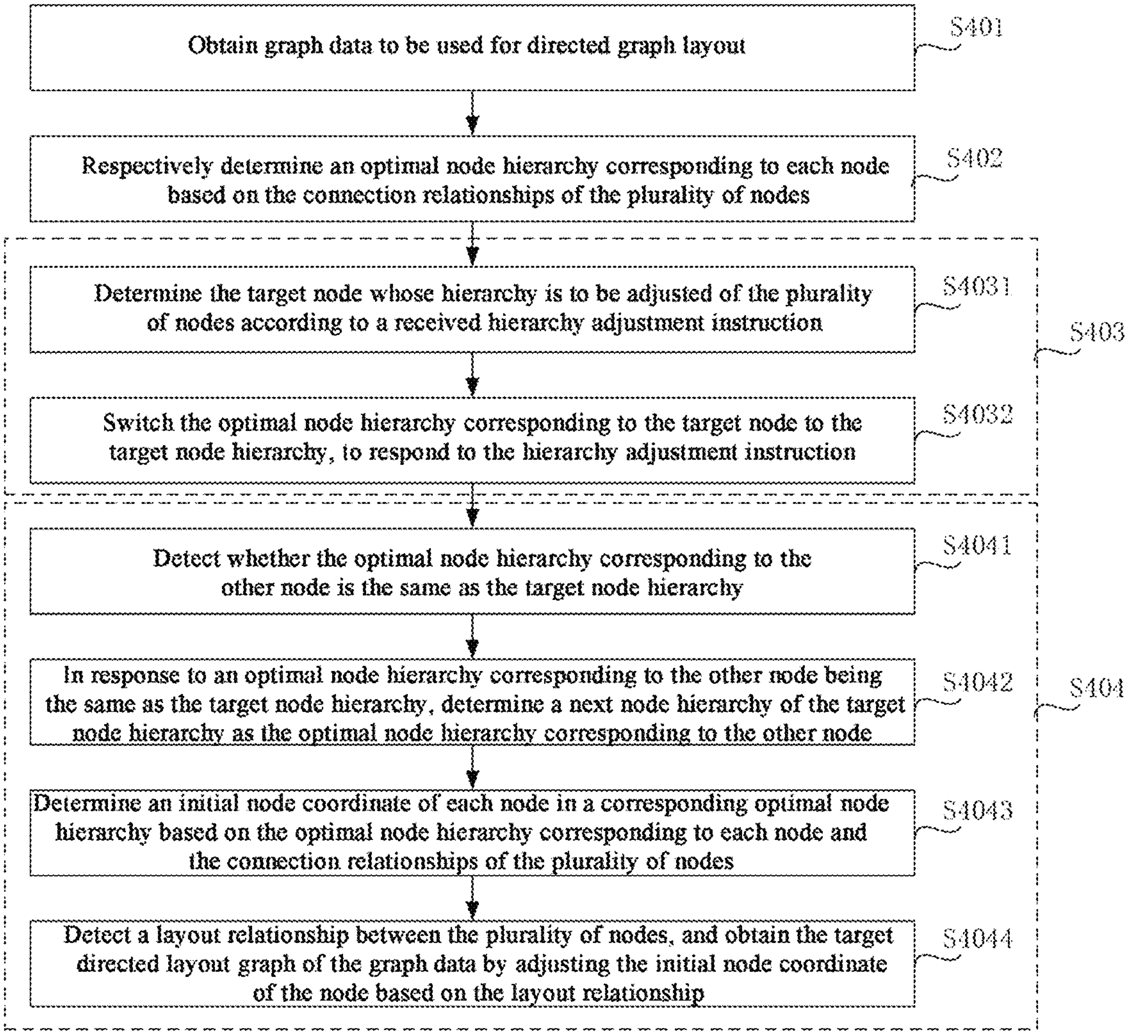

FIG.4

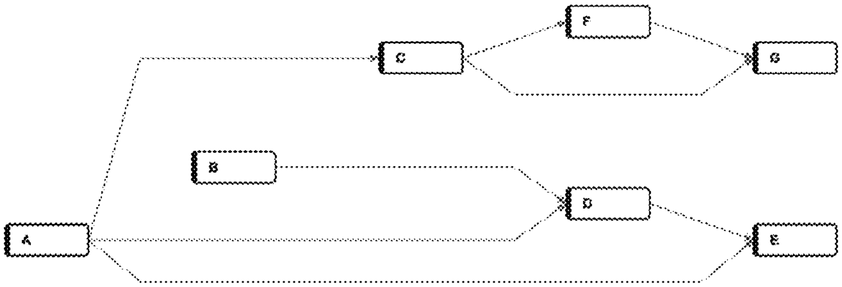

FIG.5

DIRECTED GRAPH LAYOUT METHOD AND APPARATUS, ELECTRONIC DEVICE, AND STORAGE MEDIUM

CROSS-REFERENCE TO RELATED APPLICATION(S)

This application claims priority to Chinese Application No. 202311623330.1 filed on Nov. 30, 2023, the disclosure of which is incorporated herein by reference in its entity.

TECHNICAL FIELD

The present disclosure relates to the field of data visualization technologies, and specifically relates to a directed graph layout method and apparatus, an electronic device, and a storage medium.

BACKGROUND

A directed graph is a graphical structure composed of nodes and directed edges, and can be arranged and laid out reasonably in accordance with certain rules, so that a relationship and a connection between the nodes in the graph can be displayed in an intuitive manner.

SUMMARY

According to a first aspect, the present disclosure provides a directed graph layout method, the method comprising:

- obtaining graph data to be used for directed graph layout, the graph data comprising a plurality of nodes and connection relationships of the plurality of nodes;
- respectively determining an optimal node hierarchy corresponding to each node based on the connection relationships of the plurality of nodes;
- obtaining a target node whose node hierarchy is to be adjusted and a target node hierarchy corresponding to the target node, and determining the target node hierarchy as the optimal node hierarchy corresponding to the target node; and
- determining a target directed layout graph of the graph data based on the target node hierarchy corresponding to the target node and an optimal node hierarchy corresponding to another node.

According to a second aspect, the present disclosure provides a directed graph layout apparatus, the apparatus comprising:

- a first obtaining module, configured to obtain graph data to be used for directed graph layout, the graph data comprising a plurality of nodes and connection relationships of the plurality of nodes;
- a hierarchy assignment module, configured to respectively determine an optimal node hierarchy corresponding to each node based on the connection relationships of the plurality of nodes;
- a second obtaining module, configured to obtain a target node whose node hierarchy is to be adjusted and a target node hierarchy corresponding to the target node, and determine the optimal node hierarchy corresponding to the target node as the target node hierarchy; and
- a processing module, configured to determine a target directed layout graph of the graph data based on the target node hierarchy corresponding to the target node and an optimal node hierarchy corresponding to another node.

According to a third aspect, the present disclosure provides an electronic device, comprising: a memory and a processor, the memory being in communication connection with the processor, the memory storing computer instructions, and the processor executing the computer instructions to perform the directed graph layout method according to the first aspect or any of the corresponding implementations.

According to a fourth aspect, the present disclosure provides a computer-readable storage medium, the computer-readable storage medium storing computer instructions, and the computer instructions being configured to cause a computer to perform the directed graph layout method according to the first aspect or any of the corresponding implementations.

BRIEF DESCRIPTION OF THE DRAWINGS

In order to more clearly describe a specific implementation of the present disclosure or technical solutions in the prior art, the accompanying drawings for describing the specific implementation or the prior art will be briefly described below. It is apparent that the accompanying drawings in the following description show some implementations of the present disclosure, and a person of ordinary skill in the art may still derive other drawings from these accompanying drawings without creative efforts.

FIG. 4 is a schematic flowchart of another directed graph layout method according to embodiments of the present disclosure;

FIG. 5 is a schematic diagram of a target directed layout graph according to embodiments of the present disclosure;

DETAILED DESCRIPTION

To make the objectives, technical solutions, and advantages of the embodiments of the present disclosure clearer, the technical solutions in the embodiments of the present disclosure will be described clearly and completely below with reference to the accompanying drawings in the embodiments of the present disclosure. It is clear that the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
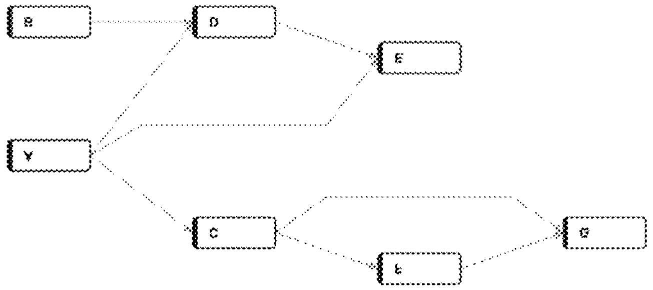
FIG. 1 is a schematic diagram of a directed layout graph according to the prior art.

A directed graph is a graphical structure composed of nodes and directed edges, and can be arranged and laid out reasonably in accordance with certain rules, so that a relationship and a connection between the nodes in the graph can be displayed in an intuitive manner. The displayed directed layout graph may be shown in FIG. 1.

Aesthetic principles of directed graph layout are as follows:

1. A hierarchical structure is displayed in the graph, and all edges are pointed to the same direction as much as possible, which helps to find directed paths and locate start and end nodes.
2. Avoid visual abnormalities irrelevant to the graph. For example, avoid a situation of edge crossing or an abrupt turn.
3. Connect two nodes with a short edge as much as possible, which helps to locate linked nodes.
4. Keep the layout graph structurally symmetrical and balanced.

In the related art, in a process of laying out a directed graph of graph data, layout positions corresponding to the nodes are automatically allocated, and cannot be adjusted, which may result in an obtained directed layout graph that cannot meet a specified layout requirement of a user, thereby affecting user experience.

In view of this, embodiments of the present disclosure provide a directed graph layout method, in which a node hierarchy to be allocated to a target node can be adjusted in a flexible manner, so that an obtained target directed layout graph can meet a specified layout requirement of a user, thereby facilitating improvement of user experience. In the directed graph layout method provided in this embodiment, the plurality of nodes are divided into the target node and the other nodes, so that a node hierarchy to be allocated to the target node can be adjusted in a flexible manner. Moreover, the plurality of nodes are subjected to directed layout based on the target node hierarchy corresponding to the target node and the optimal node hierarchies corresponding to the other nodes, so that the obtained target directed layout graph can meet a specified layout requirement of a user, thereby facilitating improvement of user experience.

According to embodiments of the present disclosure, embodiments of a directed graph layout method are provided. It should be noted that steps shown in the flowcharts of the accompanying drawings may be performed in a computer system such as a group of computer-executable instructions, and although a logical order is shown in the flowcharts, the steps shown or described may be performed in an order different from that herein in some cases.

Figure 2:
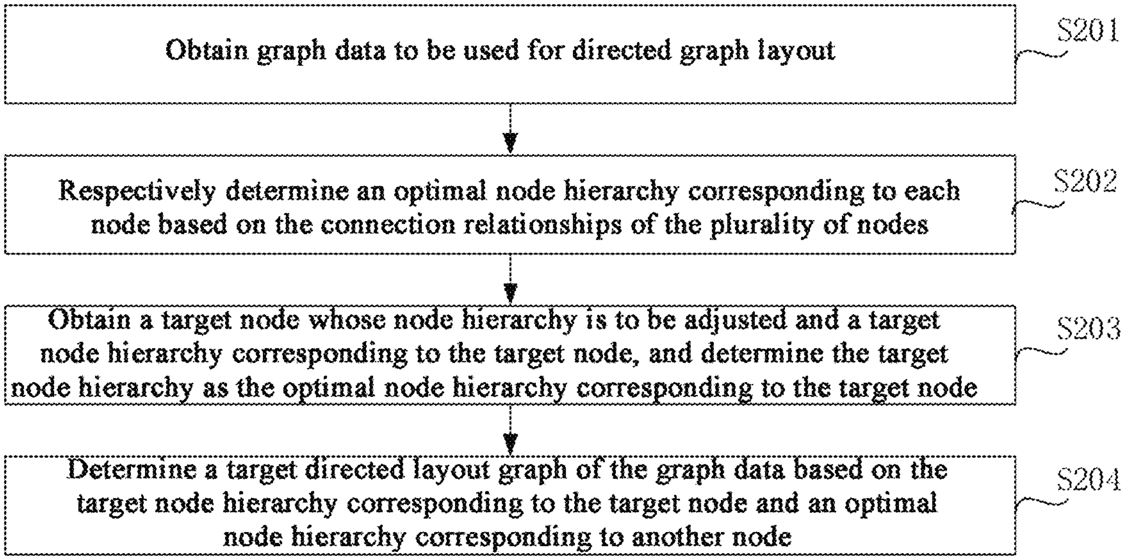
FIG. 2 is a schematic flowchart of a directed graph layout method according to embodiments of the present disclosure.

In this embodiment, a directed graph layout method is provided, which may be used in an electronic device, such as a mobile phone, a tablet computer, a computer, or the like. FIG. 2 is a flowchart of the directed graph layout method according to embodiments of the present disclosure. As shown in FIG. 2, the process includes the following steps.

Step S201: Obtaining graph data to be used for directed graph layout.

The graph data includes a plurality of nodes and connection relationships of the plurality of nodes. The graph data may be obtained from a graph database or a third-party device. A manner of obtaining the graph data is not limited here, but may be set according to an actual requirement.

Step S202: Respectively determining an optimal node hierarchy corresponding to each node based on the connection relationships of the plurality of nodes.

Figure 3:
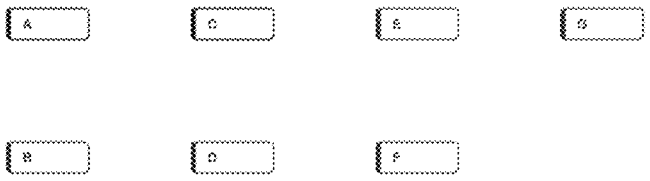
FIG. 3 is a schematic diagram of a node distribution according to embodiments of the present disclosure.

To facilitate directed layout of the plurality of nodes, the optimal node hierarchy corresponding to each node is planned based on the connection relationships of the plurality of nodes, and then the optimal node hierarchy corresponding to each node is determined. In an implementation scenario, a schematic diagram after the optimal node hierarchy of each node is planned may be shown in FIG. 3. Different rows represent different node hierarchies, and letters A to G represent different nodes.

In some optional implementations, a process of planning the optimal node hierarchy corresponding to each node may be as follows:

Construct a connection graph based on the connection relationships between the nodes. The nodes are represented as vertices in the connection graph, and the connection relationships are represented as edges between the vertices. Initialize an initial node hierarchy for each node based on a preset impact force measure of each node, so that the order of the nodes can be sorted by using the impact force measure of the node, and the initial hierarchy is allocated according to the order corresponding to each node. A node with a high impact force measure is allocated to a high hierarchy, and a node with a low impact force measure is allocated to a low hierarchy.

The initial node hierarchy of each node is adjusted through iteration based on information of edges in the connection graph and the hierarchy allocation, to obtain the optimal node hierarchy of each node. The optimal node hierarchy satisfies that a node at a high hierarchy can be directly connected to a node at a low hierarchy, thereby ensuring consistency and readability of the connection relationships. A layout optimization algorithm, such as a force-directed layout or a graph theory layout, may be used to optimize a layout position and hierarchy allocation between the nodes.

Step S203: Obtaining a target node whose node hierarchy is to be adjusted and a target node hierarchy corresponding to the target node, and determining the target node hierarchy as the optimal node hierarchy corresponding to the target node.

The target node may be understood as a node that needs to meet a preset specified layout requirement in the plurality of nodes. In the specified layout requirement, the target node hierarchy to which the target node needs to be allocated may be specified. Therefore, to meet the specified layout requirement, when the target node whose node hierarchy is to be adjusted and the corresponding target node hierarchy are determined, the target node hierarchy is used as the optimal node hierarchy corresponding to the target node.

In an example, the specified layout requirement may be deployed in a task of sending down directed layout of the graph data. In a process of performing the directed layout task, the target node may be screened from the plurality of nodes according to the specified layout requirement, and automatically allocated to the target node hierarchy.

In another example, the specified layout requirement may be a separate configuration file. A user may specify the target node whose node hierarchy is to be adjusted from the plurality of nodes according to the specified layout requirement. Therefore, in the process of performing the directed layout task, the target node may be allocated to the target node hierarchy according to the determined target node.

Step S204: Determining a target directed layout graph of the graph data based on the target node hierarchy corresponding to the target node and an optimal node hierarchy corresponding to another node.

Because the optimal node hierarchy corresponding to each node has been determined, an initial node coordinate of each node in a corresponding optimal node hierarchy can be determined based on the connection relationships between the nodes. A node order of each node in each node hierarchy is determined respectively by using a preset new weighted function and a local replacement iterative heuristic algorithm based on the initial node coordinate of each node, so as to reduce occurrence of edge crossing. The initial node coordinate of the node in the corresponding optimal node hierarchy is adjusted by constructing and sorting an auxiliary graph according to the optimal node hierarchy corresponding to each node and the node order of each node in the same node hierarchy, to obtain an optimal node coordinate. Edges of the nodes are drawn according to the node order of each node, the optimal node coordinate, and the connection relationships, to obtain the target directed layout graph that can meet aesthetic principles of directed graph layout.

In the directed graph layout method provided in this embodiment, the plurality of nodes are divided into the target node and the other nodes, so that a node hierarchy to be allocated to the target node can be adjusted in a flexible manner. Moreover, the plurality of nodes are subjected to directed layout based on the target node hierarchy corresponding to the target node and the optimal node hierarchies corresponding to the other nodes, so that the obtained target directed layout graph can meet a specified layout requirement of a user, thereby facilitating improvement of user experience.

In this embodiment, a directed graph layout method is provided, which may be used in the foregoing electronic device, such as a mobile phone or a tablet computer. FIG. 4 is a flowchart of the directed graph layout method according to embodiments of the present disclosure. As shown in FIG. 4, the process includes the following steps.

Step S401: Obtaining graph data to be used for directed graph layout. For details, see Step S201 in the embodiments shown in FIG. 2, which is not described herein again.

Step S402: Respectively determining an optimal node hierarchy corresponding to each node based on the connection relationships of the plurality of nodes. For details, see Step S202 in the embodiments shown in FIG. 2, which is not described herein again.

Step S403: Obtaining a target node whose node hierarchy is to be adjusted and a corresponding target node hierarchy, and determining the target node hierarchy as the optimal node hierarchy corresponding to the target node.

Specifically, Step S403 includes the following steps.

Step S4031: Determining the target node whose hierarchy is to be adjusted of the plurality of nodes according to a received hierarchy adjustment instruction.

The hierarchy adjustment instruction is used for switching the optimal node hierarchy corresponding to the target node. The hierarchy adjustment instruction may be automatically triggered and generated after the optimal node hierarchy of each node is determined, or may be sent by a user through the electronic device. A generation manner of the hierarchy adjustment instruction is not limited here, but may be set according to an actual requirement.

Step S4032: Switching the optimal node hierarchy corresponding to the target node to the target node hierarchy, to respond to the hierarchy adjustment instruction.

To respond to the received hierarchy adjustment instruction, after the target node and the target node hierarchy are determined, the target node is adjusted from the corresponding optimal node hierarchy to the target node hierarchy, to meet a preset specified layout requirement.

Step S404: Determining a target directed layout graph of the graph data based on the target node hierarchy corresponding to the target node and an optimal node hierarchy corresponding to another node. For details, see Step S204 in the embodiments shown in FIG. 2, which is not described herein again.

Specifically, Step S404 includes the following steps.

Step S4041: Detecting whether the optimal node hierarchy corresponding to the other node is the same as the target node hierarchy.

The target node hierarchy may be understood as a node hierarchy in which the target node is to be deployed. Therefore, the node hierarchy includes only the target node. To ensure that a task of performing directed layout on the plurality of nodes can be performed smoothly, it is detected whether the optimal node hierarchy corresponding to the other node is the same as the target node hierarchy, to avoid a situation that the other node is mistakenly allocated to the target node hierarchy.

Step S4042: In response to an optimal node hierarchy corresponding to the other node being the same as the target node hierarchy, determining a next node hierarchy of the target node hierarchy as the optimal node hierarchy corresponding to the other node.

If the optimal node hierarchy corresponding to the other node is the same as the target node hierarchy, it indicates that the optimal node hierarchy corresponding to the other node needs to be adjusted. To reduce an impact of adjusting the optimal node hierarchy corresponding to the other node, the next node hierarchy of the target node hierarchy is used as the optimal node hierarchy corresponding to the other node, so that a hierarchy relationship between the other node and the target node is relatively stable, and continuity between the hierarchy of the other node and the hierarchy of the target node can also be ensured as much as possible.

Step S4043: Determining an initial node coordinate of each node in a corresponding optimal node hierarchy based on the optimal node hierarchy corresponding to each node and the connection relationships of the plurality of nodes.

To determine the node coordinate of each node in the corresponding optimal node hierarchy, the initial node coordinate of each node in the corresponding optimal node hierarchy is first determined based on the optimal node hierarchy corresponding to each node and the connection relationships of the plurality of nodes, so that the initial node coordinate of each node can be specifically adjusted according to a connection situation between the nodes in a subsequent process.

In some optional implementation scenarios, referring to the optimal node hierarchy corresponding to each node shown in FIG. 2, Node A, Node B, and Node C are target nodes that meet the specified layout requirement, and Node A needs to be allocated to a first hierarchy (a target node corresponding to Node A), Node B needs to be allocated to a second hierarchy (a target node corresponding to Node B), and Node C needs to be allocated to a third hierarchy (a target node corresponding to Node C). Then, Node A is allocated to the first hierarchy, Node B is allocated to the second hierarchy, and Node C is allocated to the third hierarchy. Then, the node coordinate of each node is determined based on the optimal node hierarchy corresponding to the other node, to obtain the target directed layout graph shown in FIG. 5 according to the connection relationships between the nodes.

In some optional implementation methods, Step S4043 includes the following steps.

Step a1: Obtaining a first aggregated node by aggregating a plurality of first target nodes at a same hierarchy in the target node hierarchy.

Step a2: Obtaining first connection relationships by inheriting, by the first aggregated node, the connection relationships of the plurality of first target nodes, and adjusting the connection relationships of the plurality of nodes.

Step a3: Determining the initial node coordinate of each node in the corresponding optimal node hierarchy based on the optimal node hierarchy corresponding to the first aggregated node, the optimal node hierarchy corresponding to the other node, and the first connection relationships.

Specifically, to enable connection between the plurality of first target nodes at the same target node hierarchy to be more compact, the plurality of first target nodes at the same hierarchy in the target node hierarchy are aggregated, so that the plurality of first target nodes are replaced with the first aggregated node, and the first aggregated node inherits the connection relationships of the first target nodes.

Because the connection relationships of the plurality of nodes are the connection relationships between the plurality of nodes before aggregation, to ensure that a directed layout task can be smoothly performed, the connection relationships of the plurality of nodes are adjusted according to the connection relationships of the first aggregated node, to obtain the first connection relationships. The first connection relationships may be understood as connection relationships between the other nodes and the first aggregated node.

Because the number of the nodes and the connection relationships are both adjusted, the initial node coordinate of each node in the corresponding optimal node hierarchy is determined based on the optimal node hierarchy corresponding to the first aggregated node, the optimal node hierarchy corresponding to the other node, and the first connection relationships, so that the initial node coordinate of each node can be specifically adjusted according to the connection situation between the nodes in a subsequent process.

In some other optional implementation methods, if there are a plurality of target node hierarchies, Step S4043 includes the following steps.

Step b1: Obtaining a second aggregated node by aggregating a plurality of second target nodes at consecutive hierarchies in the target node hierarchy.

Step b2: Obtaining second connection relationships by inheriting, by the second aggregated node, the connection relationships of the plurality of second target nodes, and adjusting the connection relationships of the plurality of nodes.

Step b3: Determining the initial node coordinate of each node in the corresponding optimal node hierarchy based on the optimal node hierarchy corresponding to the second aggregated node, the optimal node hierarchy corresponding to the other node, and the second connection relationships.

Specifically, to enable connection between the plurality of second target nodes at consecutive target node hierarchies to be more compact, the plurality of second target nodes at consecutive hierarchies in the target node hierarchy are aggregated, so that the plurality of second target nodes are replaced with the second aggregated node, and the second aggregated node inherits the connection relationships of the second target nodes.

Because the connection relationships of the plurality of nodes are the connection relationships between the plurality of nodes before aggregation, to ensure that a directed layout task can be smoothly performed, the connection relationships of the plurality of nodes are adjusted according to the connection relationships of the second aggregated node, to obtain the second connection relationships. The second connection relationships may be understood as connection relationships between the other nodes and the second aggregated node.

Figure 6:
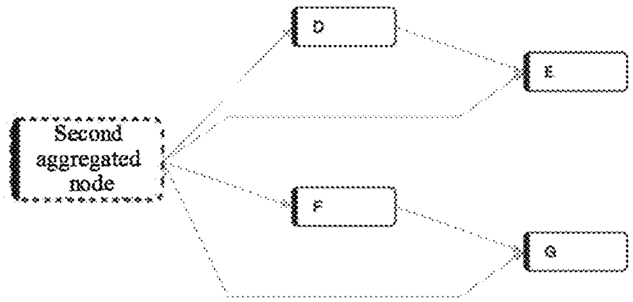
FIG. 6 is a schematic diagram of a connection relationship between another two nodes according to embodiments of the present disclosure.

In some optional implementation scenarios, referring to an initial directed layout graph shown in FIG. 5, Node A, Node B, and Node Care aggregated to obtain a second aggregated node, and then the second aggregated node inherits the connection relationships of the second target nodes, so that second connection relationships shown in FIG. 6 can be obtained.

Because the number of the nodes and the connection relationships are both adjusted, the initial node coordinate of each node in the corresponding optimal node hierarchy is determined based on the optimal node hierarchy corresponding to the second aggregated node, the optimal node hierarchy corresponding to the other node, and the second connection relationships, so that the initial node coordinate of each node can be specifically adjusted according to the connection situation between the nodes in a subsequent process.

Step S4044: Detecting a layout relationship between the plurality of nodes, and obtaining the target directed layout graph of the graph data by adjusting the initial node coordinate of the node based on the layout relationship.

In the directed graph layout method provided in this embodiment, not only the specified layout requirement can be met, but also the layout of each node is more compact, so that a topological structure of the directed graph can be clearly displayed while the aesthetic principles of directed graph layout can be met.

In some optional implementation methods, the target node whose node hierarchy is to be adjusted may be obtained in the following manner.

Step c1: Determining a candidate node hierarchy based on a number of nodes in each of the optimal node hierarchies.

To improve efficiency of directed layout, the optimal node hierarchy in which the number of nodes at a same hierarchy is greater than 1 is used as the candidate node hierarchy based on the number of nodes in each of the optimal node hierarchies, to identify whether there is a crossed connection between the nodes of the candidate node hierarchy in a directed layout process.

Step c2: Obtaining the target node whose hierarchy is to be adjusted based on connection relationships between nodes in the candidate node hierarchy.

Based on the connection relationships between the nodes in the candidate node hierarchy, it may be determined whether there is a connection relationship between the nodes in the candidate node hierarchy, and then a node in the candidate node that affects a connection between the other nodes may be used as the target node.

In some optional implementation methods, Step c2 includes the following steps.

Step c21: Respectively determining a connection order between the nodes and an initial node position between the nodes in the candidate node hierarchy based on the connection relationships between the nodes in the candidate node hierarchy.

Step c22: Detecting, in the candidate node hierarchy, whether a plurality of third nodes connected at a same hierarchy exist according to the connection order between the nodes.

Step c23: In response to the plurality of third nodes connected at the same hierarchy existing, determining whether a target connection relationship between the initial node positions of the plurality of third nodes exists according to the initial node positions of the plurality of third nodes.

Step c24: In response to the target connection relationship between the initial node positions of the plurality of third nodes existing, determining a fourth node between the plurality of third nodes as the target node whose hierarchy is to be adjusted.

Specifically, to determine whether there are connected third nodes in the candidate node hierarchy, the connection order between the nodes and the initial node position between the nodes in the candidate node hierarchy are first determined based on the connection relationships between the nodes in the candidate node hierarchy, and then a plurality of nodes with a connection relationship are referred to as the third nodes. To determine whether a connection between the plurality of third nodes affects connection display between the other nodes, it is determined whether there is the target connection relationship between the initial node positions of the plurality of third nodes. The target connection relationship is a connection relationship overlapping a connection between the plurality of third nodes. If there is the target connection relationship between the initial node positions of the plurality of third nodes, it indicates that there is a fourth node between the initial node positions of the plurality of third nodes, and a connection between the fourth node and the other nodes in the candidate node hierarchy is covered by the connection between the plurality of third nodes, and therefore the node hierarchy corresponding to the fourth node needs to be adjusted. Therefore, the fourth node is determined as the target node whose hierarchy is to be adjusted, to ensure that a connection between the fourth node and the other nodes can be clearly displayed.

Figure 7:
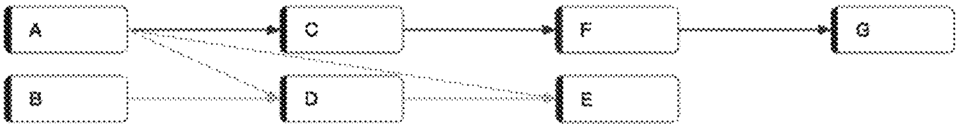
FIG. 7 is a schematic diagram of a connection relationship between yet another two nodes according to embodiments of the present disclosure.

For example: As shown in FIG. 7, a candidate node hierarchy in which Node A, Node C, Node F, and Node G are located is used as an example. Node C is connected to Node G, and Node F is connected to Node G. Because Node F is located between Node C and Node G, and the connection between Node C and Node G affects connection display between Node F and Node G, Node F may be used as the target node whose hierarchy is to be adjusted.

In some other optional implementation methods, Step c2 further includes the following step.

Step c25: In response to the target connection relationship between the initial node positions of the plurality of third nodes not existing, determining that the target node whose hierarchy is to be adjusted in the candidate node hierarchy does not exist.

If there is no target connection relationship between the initial node positions of the plurality of third nodes, it indicates that the connection between the plurality of third nodes does not affect a connection between the other nodes at the same node hierarchy. Therefore, it may be determined that there is no target node whose hierarchy is to be adjusted in the candidate node hierarchy.

The target node is determined in the foregoing manner, which helps to clearly represent a connection relationship between each node.

In some optional implementation scenarios, performing a task of performing directed layout on the graph data may include the following process.

Determining an optimal node hierarchy corresponding to each node based on connection relationships of the plurality of nodes in the graph data.

Obtaining a target node whose node hierarchy is to be adjusted and a target node hierarchy corresponding to the target node, and determining the optimal node hierarchy corresponding to the target node as the target node hierarchy.

Detecting whether an optimal node hierarchy corresponding to another node is the same as the target node hierarchy. In response to the optimal node hierarchy corresponding to the other node being the same as the target node hierarchy, determining a next node hierarchy of the target node hierarchy as the optimal node hierarchy corresponding to the other node.

In response to one target node hierarchy existing, aggregating a plurality of first target nodes at a same hierarchy in the target node hierarchy to obtain a first aggregated node. Obtaining first connection relationships by inheriting, by the first aggregated node, the connection relationships of the plurality of first target nodes, and adjusting the connection relationships of the plurality of nodes. Determining the initial node coordinate of each node in the corresponding optimal node hierarchy based on the optimal node hierarchy corresponding to the first aggregated node, the optimal node hierarchy corresponding to the other node, and the first connection relationships.

In response to a number of hierarchies for the target node hierarchy being multiple, obtaining a second aggregated node by aggregating a plurality of second target nodes at consecutive hierarchies in the target node hierarchy. Obtaining second connection relationships by inheriting, by the second aggregated node, the connection relationships of the plurality of second target nodes, and adjusting the connection relationships of the plurality of nodes. Determining the initial node coordinate of each node in the corresponding optimal node hierarchy based on the optimal node hierarchy corresponding to the second aggregated node, the optimal node hierarchy corresponding to the other node, and the second connection relationships.

A node order of each node in each node hierarchy is determined respectively by using a preset new weighted function and a local replacement iterative heuristic algorithm based on the initial node coordinate of each node, so as to reduce occurrence of edge crossing. The initial node coordinate of the node in the corresponding optimal node hierarchy is adjusted by constructing and sorting an auxiliary graph according to the optimal node hierarchy corresponding to each node and the node order of each node in the same node hierarchy, to obtain an optimal node coordinate. Edges of the nodes are drawn according to the node order of each node, the optimal node coordinate, and the connection relationships, to obtain the target directed layout graph that can meet aesthetic principles of directed graph layout.

Figure 8:
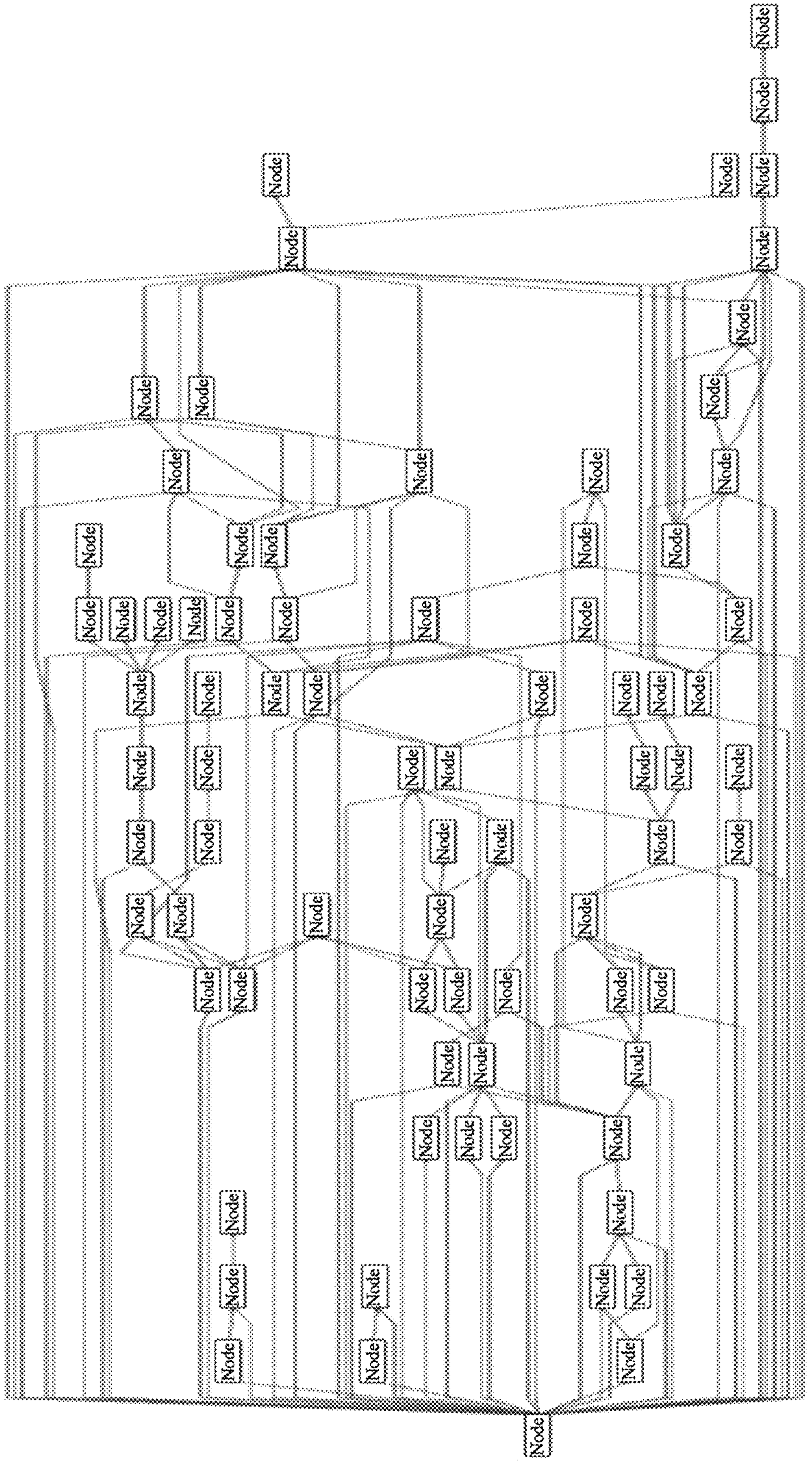
FIG. 8 is a schematic diagram of another directed layout graph according to embodiments of the present disclosure.
Figure 9:
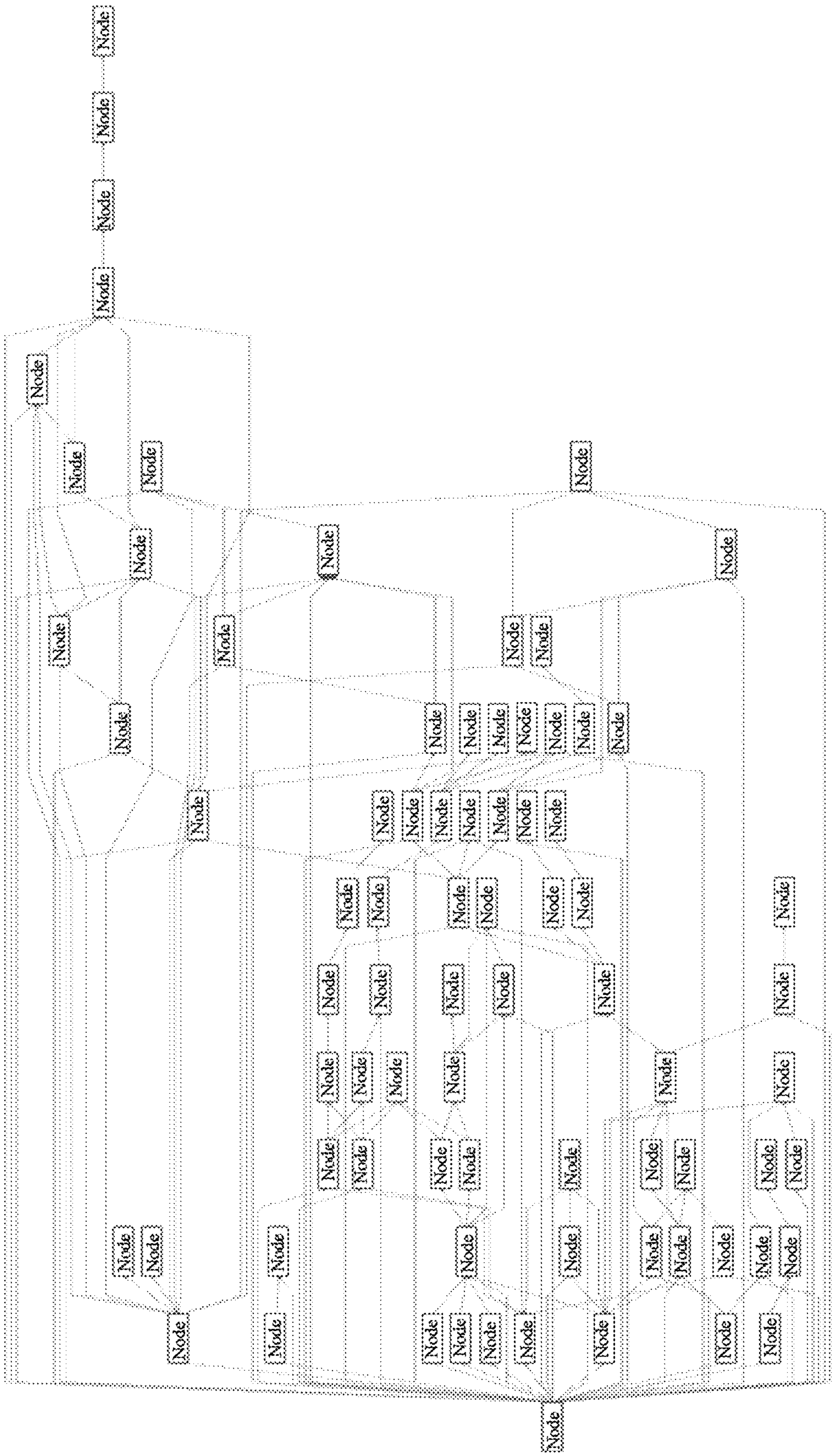
FIG. 9 is a schematic diagram of another target directed layout graph according to embodiments of the present disclosure.

In some other optional implementation scenarios, for a complex large-scale directed graph data sample, a directed layout graph shown in FIG. 8 may be obtained by using a traditional directed layout method. However, by using the directed graph layout method provided in the present disclosure, a target directed layout graph shown in FIG. 9 may be obtained. Therefore, by using the directed graph layout method provided in the present disclosure, not only can the optimal node hierarchy corresponding to the target node be flexibly adjusted, but also the layout of each target node in the target node hierarchy can be more compact, so that a target directed layout graph more in line with aesthetic principles can be obtained.

In this embodiment, a directed graph layout apparatus is further provided. The apparatus is configured to implement the foregoing embodiments and preferred implementation methods, and the parts that have been described are not described again. As used below, the term "module" may be a combination of software and/or hardware that implements a predetermined function. Although the apparatus described in the following embodiments is preferably implemented by software, an implementation of hardware, or a combination of software and hardware is also possible and contemplated.

Figure 10:
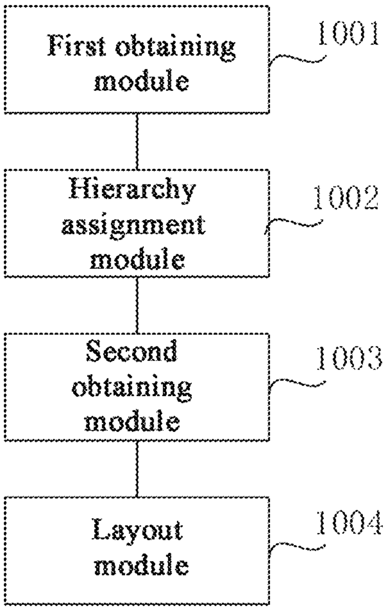
FIG. 10 is a block diagram of a structure of a directed graph layout apparatus according to embodiments of the present disclosure.

These embodiments provide a directed graph layout apparatus. As shown in FIG. 10, the apparatus includes:

- a first obtaining module 1001, configured to obtain graph data to be used for directed graph layout, the graph data comprising a plurality of nodes and connection relationships of the plurality of nodes;
- a hierarchy assignment module 1002, configured to respectively determine an optimal node hierarchy corresponding to each node based on the connection relationships of the plurality of nodes;
- a second obtaining module 1003, configured to obtain a target node whose node hierarchy is to be adjusted and a target node hierarchy corresponding to the target node, and determine the optimal node hierarchy corresponding to the target node as the target node hierarchy; and
- a processing module 1004, configured to determine a target directed layout graph of the graph data based on the target node hierarchy corresponding to the target node and an optimal node hierarchy corresponding to another node.

In some optional implementations, the second obtaining module 1003 includes: a node determining unit, configured to determine the target node whose hierarchy is to be adjusted of the plurality of nodes according to a received hierarchy adjustment instruction, the hierarchy adjustment instruction being used for switching the optimal node hierarchy corresponding to the target node; and an allocation unit, configured to switch the optimal node hierarchy corresponding to the target node to the target node hierarchy, to respond to the hierarchy adjustment instruction.

In some optional implementations, the processing module 1024 includes: a first detection unit, configured to detect whether the optimal node hierarchy corresponding to the other node is the same as the target node hierarchy; a first adjustment unit, configured to: in response to an optimal node hierarchy corresponding to the other node being the same as the target node hierarchy, determine a next node hierarchy of the target node hierarchy as the optimal node hierarchy corresponding to the other node; a construction unit, configured to determine an initial node coordinate of each node in a corresponding optimal node hierarchy based on the optimal node hierarchy corresponding to each node and the connection relationships of the plurality of nodes; and a second adjustment unit, configured to detect a layout relationship between the plurality of nodes, and obtaining the target directed layout graph of the graph data by adjusting the initial node coordinate of the node based on the layout relationship.

In some optional implementations, the second adjustment unit includes: a first aggregation unit, configured to obtain a first aggregated node by aggregating a plurality of first target nodes at a same hierarchy in the target node hierarchy; a third adjustment unit, configured to obtain first connection relationships by inheriting, by the first aggregated node, the connection relationships of the plurality of first target nodes, and adjusting the connection relationships of the plurality of nodes; and a first execution unit, configured to determine the initial node coordinate of each node in the corresponding optimal node hierarchy based on the optimal node hierarchy corresponding to the first aggregated node, the optimal node hierarchy corresponding to the other node, and the first connection relationships.

In some other optional implementation methods, in response to a number of hierarchies for the target node hierarchy being multiple, the second adjustment unit includes: a second aggregation unit, configured to obtain a second aggregated node by aggregating a plurality of second target nodes at consecutive hierarchies in the target node hierarchy; a fourth adjustment unit, configured to obtain second connection relationships by inheriting, by the second aggregated node, the connection relationships of the plurality of second target nodes, and adjusting the connection relationships of the plurality of nodes; and a second execution unit, configured to determine the initial node coordinate of each node in the corresponding optimal node hierarchy based on the optimal node hierarchy corresponding to the second aggregated node, the optimal node hierarchy corresponding to the other node, and the second connection relationships.

In some optional implementation methods, the second obtaining module 1003 includes: a first processing unit, configured to determine a candidate node hierarchy based on a number of nodes in each of the optimal node hierarchies, the candidate node hierarchy comprising more than one node; and a screening unit, configured to obtain the target node whose hierarchy is to be adjusted based on connection relationships between nodes in the candidate node hierarchy.

In some optional implementation methods, the screening unit includes: a first determining unit, configured to respectively determine a connection order between the nodes and an initial node position between the nodes in the candidate node hierarchy based on the connection relationships between the nodes in the candidate node hierarchy; a second detection unit, configured to detect, in the candidate node hierarchy, whether a plurality of third nodes connected at a same hierarchy exist according to the connection order between the nodes; a second determining unit, configured to: in response to the plurality of third nodes connected at the same hierarchy existing, determine whether a target connection relationship between the initial node positions of the plurality of third nodes exists according to the initial node positions of the plurality of third nodes, the target connection relationship being a connection relationship overlapping lines between the plurality of third nodes; and a third determining unit, configured to: in response to the target connection relationship between the initial node positions of the plurality of third nodes existing, determine a fourth node between the plurality of third nodes as the target node whose hierarchy is to be adjusted.

In some optional implementation methods, the screening unit further includes: a fourth determining unit, configured to: in response to the target connection relationship between the initial node positions of the plurality of third nodes not existing, determine that the target node whose hierarchy is to be adjusted in the candidate node hierarchy does not exist.

Further function descriptions of the foregoing modules and units are the same as those in the foregoing corresponding embodiments, and are not described herein again.

The directed graph layout apparatus in these embodiments is presented in a form of functional units. The units herein refer to an ASIC (Application Specific Integrated Circuit) circuit, a processor and a memory that execute one or more software or fixed programs, and/or another apparatus that can provide the foregoing functions.

Embodiments of the present disclosure further provide an electronic device, which includes the directed graph layout apparatus shown in FIG. 10.

Figure 11:
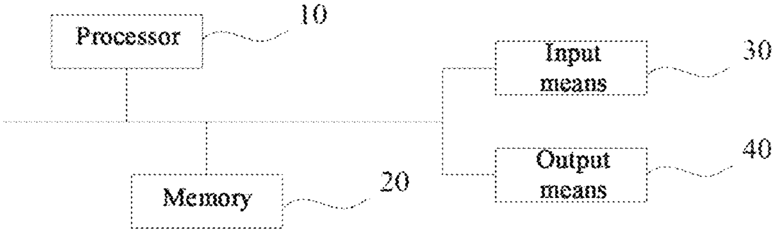
FIG. 11 is a schematic diagram of a hardware structure of an electronic device according to embodiments of the present disclosure.

Referring to FIG. 11, FIG. 11 is a schematic diagram of a structure of an electronic device according to optional embodiments of the present disclosure. As shown in FIG. 11, the electronic device includes one or more processors 10, a memory 20, and an interface for connecting various components, including a high-speed interface and a low-speed interface. The components are connected to each other by using different buses, and can be installed on a common mainboard or installed in another manner as needed. The processor may process instructions executed in the electronic device, including instructions stored in the memory or on the memory and used to display graphical information of a GUI on an external input/output apparatus (such as a display apparatus coupled to the interface). In some optional implementations, if needed, a plurality of processors and/or a plurality of buses may be used together with a plurality of memories and a plurality of memories. Similarly, a plurality of electronic devices may be connected, and each device provides some necessary operations (for example, as a server array, a group of blade servers, or a multi-processor system). FIG. 11 shows one processor 10 as an example.

The processor 10 may be a central processing unit, a network processor, or a combination thereof. The processor 10 may further include a hardware chip. The hardware chip may be an ASIC (Application Specific Integrated Circuit), a programmable logic device, or a combination thereof. The programmable logic device may be a complex programmable logic device, a field programmable gate array, a general array logic, or any combination thereof.

The memory 20 stores instructions executable by at least one processor 10, to enable the at least one processor 10 to perform the method shown in the foregoing embodiment.

The memory 20 may include a program storage area and a data storage area. The program storage area may store an operating system and an application program required for at least one function. The data storage area may store data created according to use of the electronic device, and the like. In addition, the memory 20 may include a high-speed random access memory, and may further include a non-volatile memory, for example, at least one magnetic disk storage device, a flash memory device, or another non-volatile solid-state storage device. In some optional implementations, the memory 20 may alternatively include a memory remotely arranged relative to the processor 10, and the remote memory may be connected to the electronic device through a network. Examples of the network include, but are not limited to, the Internet, an intranet, a local area network, a mobile communication network, and a combination thereof.

The memory 20 may include a volatile memory, for example, a random access memory; the memory may alternatively include a non-volatile memory, for example, a flash memory, a hard disk, or a solid-state hard disk; and the memory 20 may alternatively include a combination of the foregoing types of memories.

The electronic device further includes an input apparatus 30 and an output apparatus 40. The processor 10, the memory 20, the input apparatus 30, and the output apparatus 40 may be connected through a bus or in another manner. In FIG. 11, the connection through the bus is used as an example.

The input apparatus 30 may receive inputted numeric or character information, and generate key signal inputs related to user settings and function control of the electronic device, for example, a touch screen, a keypad, a mouse, a trackpad, a touchpad, an indicator pole, one or more mouse buttons, a trackball, a joystick, and the like. The output apparatus 40 may include a display apparatus, an auxiliary lighting apparatus (for example, an LED), and a tactile feedback apparatus (for example, a vibration motor), and the like. The foregoing display apparatus includes, but is not limited to, a liquid crystal display, a light-emitting diode, a display, and a plasma display. In some optional implementations, the display apparatus may be a touch screen.

Embodiments of the present disclosure further provide a computer-readable storage medium. The method according to the embodiments of the present disclosure may be implemented in hardware, firmware, or be implemented as computer code that can be recorded in a storage medium or originally stored in a remote storage medium or a non-transitory machine-readable storage medium and downloaded through a network and then stored in a local storage medium, so that the method described herein may be stored in such software processing on a storage medium using a general-purpose computer, a special-purpose processor, or programmable or special-purpose hardware. The storage medium may be a magnetic disk, an optical disc, a read-only memory, a random access memory, a flash memory, a hard disk, a solid-state hard disk, or the like; or the storage medium may further include a combination of the foregoing types of memories. It may be understood that a computer, a processor, a microprocessor, a controller, or programmable hardware includes a storage component that can store or receive software or computer code, and when the software or computer code is accessed and executed by the computer, the processor, or the hardware, the method shown in the foregoing embodiments is implemented.

Although the embodiments of the present disclosure are described with reference to the accompanying drawings, persons of ordinary skill in the art may make various modifications and variations without departing from the spirit and scope of the present disclosure. Such modifications and variations all fall within the scope defined by the appended claims.

The invention claimed is:

1. A directed graph layout method, comprising:

obtaining graph data to be used for directed graph layout, the graph data comprising a plurality of nodes and connection relationships of the plurality of nodes;

respectively determining an optimal node hierarchy corresponding to each node based on the connection relationships of the plurality of nodes;

obtaining a first node whose node hierarchy is to be adjusted and a first node hierarchy corresponding to the first node, and determining the first node hierarchy as the optimal node hierarchy corresponding to the first node, wherein the first node and the first node hierarchy are associated with a layout requirement specified by a user, and the layout requirement indicates that the first node needs to be allocated to the first node hierarchy;

determining a first directed layout graph of the graph data based on the first node hierarchy corresponding to the first node and an optimal node hierarchy corresponding to another node; and displaying the first directed layout graph by drawing the plurality of nodes and edges of the plurality of nodes according to the layout requirement specified by the user, wherein determining the first directed layout graph of the graph data based on the first node hierarchy corresponding to the first node and the optimal node hierarchy corresponding to the other node comprises:

detecting whether the optimal node hierarchy corresponding to the other node is the same as the first node hierarchy;

in response to the optimal node hierarchy corresponding to the other node being the same as the first node hierarchy, determining a next node hierarchy of the first node hierarchy as the optimal node hierarchy corresponding to the other node;

determining an initial node coordinate of each node in a corresponding optimal node hierarchy based on the optimal node hierarchy corresponding to each node and the connection relationships of the plurality of nodes;

determining an order of nodes in each node hierarchy by using a weighted function and a local replacement iterative heuristic algorithm based on the initial node coordinate of each node;

adjusting the initial node coordinate of each node by constructing and sorting an auxiliary graph based on the optimal node hierarchy corresponding to each node and the order of nodes in each node hierarchy, to obtain an optimal node coordinate of each node; and drawing the edges of the plurality of nodes based on the order of nodes in each node hierarchy, the optimal node coordinate of each node, and the connection relationships of the plurality of nodes, to obtain the first directed layout graph.

2. The method according to claim 1, wherein obtaining the first node whose node hierarchy is to be adjusted and the first node hierarchy corresponding to the first node, and determining the first node hierarchy as the optimal node hierarchy corresponding to the first node comprises:

determining the first node whose node hierarchy is to be adjusted from the plurality of nodes according to a received hierarchy adjustment instruction, the hierarchy adjustment instruction being used for switching the optimal node hierarchy corresponding to the first node; and switching the optimal node hierarchy corresponding to the first node to the first node hierarchy, in response to receiving the hierarchy adjustment instruction.

3. The method according to claim 1, wherein determining the initial node coordinate of each node in the corresponding optimal node hierarchy based on the optimal node hierarchy corresponding to each node and the connection relationships of the plurality of nodes comprises:

obtaining a first aggregated node by aggregating a plurality of first nodes at a same hierarchy in the first node hierarchy;

obtaining first connection relationships by inheriting, by the first aggregated node, the connection relationships of the plurality of first nodes, and adjusting the connection relationships of the plurality of nodes; and determining the initial node coordinate of each node in the corresponding optimal node hierarchy based on the optimal node hierarchy corresponding to the first aggregated node, the optimal node hierarchy corresponding to the other node, and the first connection relationships.

4. The method according to claim 1, wherein, in response to a number of hierarchies for the first node hierarchy being multiple, determining the initial node coordinate of each node in the corresponding optimal node hierarchy based on the optimal node hierarchy corresponding to each node and the connection relationships of the plurality of nodes comprises:

obtaining a second aggregated node by aggregating a plurality of second nodes at consecutive hierarchies in the first node hierarchy;

obtaining second connection relationships by inheriting, by the second aggregated node, the connection relationships of the plurality of second nodes, and adjusting the connection relationships of the plurality of nodes; and determining the initial node coordinate of each node in the corresponding optimal node hierarchy based on the optimal node hierarchy corresponding to the second aggregated node, the optimal node hierarchy corresponding to the other node, and the second connection relationships.

5. The method according to claim 1, wherein obtaining the first node whose node hierarchy is to be adjusted comprises:

determining a candidate node hierarchy based on a number of nodes in each of a plurality of optimal node hierarchies, the candidate node hierarchy comprising more than one node; and obtaining the first node whose node hierarchy is to be adjusted based on connection relationships between nodes in the candidate node hierarchy.

6. The method according to claim 5, wherein obtaining the first node whose node hierarchy is to be adjusted based on the connection relationships between the nodes in the candidate node hierarchy comprises:

respectively determining a connection order between the nodes and initial node positions between the nodes in the candidate node hierarchy based on the connection relationships between the nodes in the candidate node hierarchy;

detecting, in the candidate node hierarchy, whether a plurality of third nodes connected at a same hierarchy exist according to the connection order between the nodes;

in response to detecting that the plurality of third nodes connected at the same hierarchy exist, determining whether a first connection relationship between the initial node positions of the plurality of third nodes exists according to the initial node positions of the plurality of third nodes, the first connection relationship being a connection relationship overlapping lines between the plurality of third nodes; and in response to determining that the first connection relationship between the initial node positions of the plurality of third nodes exists, determining a fourth node between the plurality of third nodes as the first node whose node hierarchy is to be adjusted.

7. The method according to claim 6, wherein obtaining the first node whose node hierarchy is to be adjusted based on the connection relationships between nodes in the candidate node hierarchy further comprises:

in response to determining that the first connection relationship between the initial node positions of the plurality of third nodes does not exist, determining that the first node whose node hierarchy is to be adjusted in the candidate node hierarchy does not exist.

8. An electronic device, comprising:

a memory and a processor, the memory being communicatively connected with the processor, the memory storing computer instructions, and the computer instructions, when executed by the processor, cause the device to:

obtain graph data to be used for directed graph layout, the graph data comprising a plurality of nodes and connection relationships of the plurality of nodes;

respectively determine an optimal node hierarchy corresponding to each node based on the connection relationships of the plurality of nodes;

obtain a first node whose node hierarchy is to be adjusted and a first node hierarchy corresponding to the first node, and determine the first node hierarchy as the optimal node hierarchy corresponding to the first node, wherein the first node and the first node hierarchy are associated with a layout requirement specified by a user, and the layout requirement indicates that the first node needs to be allocated to the first node hierarchy;

determine a first directed layout graph of the graph data based on the first node hierarchy corresponding to the first node and an optimal node hierarchy corresponding to another node; and display the first directed layout graph by drawing the plurality of nodes and edges of the plurality of nodes according to the layout requirement specified by the user, wherein the computer instructions causing the device to determine the first directed layout graph of the graph data based on the first node hierarchy corresponding to the first node and the optimal node hierarchy corresponding to the other node further cause the device to:

detect whether the optimal node hierarchy corresponding to the other node is the same as the first node hierarchy;

in response to the optimal node hierarchy corresponding to the other node being the same as the first node hierarchy, determine a next node hierarchy of the first node hierarchy as the optimal node hierarchy corresponding to the other node;

determine an initial node coordinate of each node in a corresponding optimal node hierarchy based on the optimal node hierarchy corresponding to each node and the connection relationships of the plurality of nodes;

determine an order of nodes in each node hierarchy by using a weighted function and a local replacement iterative heuristic algorithm based on the initial node coordinate of each node;

adjust the initial node coordinate of each node by constructing and sorting an auxiliary graph based on the optimal node hierarchy corresponding to each node and the order of nodes in each node hierarchy, to obtain an optimal node coordinate of each node; and draw the edges of the plurality of nodes based on the order of nodes in each node hierarchy, the optimal node coordinate of each node, and the connection relationships of the plurality of nodes, to obtain the first directed layout graph.

9. The device according to claim 8, wherein the computer instructions causing the device to obtain the first node whose node hierarchy is to be adjusted and the first node hierarchy corresponding to the first node, and determine the first node hierarchy as the optimal node hierarchy corresponding to the first node further cause the device to:

determine the first node whose node hierarchy is to be adjusted from the plurality of nodes according to a received hierarchy adjustment instruction, the hierarchy adjustment instruction being used for switching the optimal node hierarchy corresponding to the first node; and switch the optimal node hierarchy corresponding to the first node to the first node hierarchy, in response to receiving the hierarchy adjustment instruction.

10. The device according to claim 8, wherein the computer instructions causing the device to determine the initial node coordinate of each node in the corresponding optimal node hierarchy based on the optimal node hierarchy corresponding to each node and the connection relationships of the plurality of nodes further cause the device to:

obtain a first aggregated node by aggregating a plurality of first nodes at a same hierarchy in the first node hierarchy;

obtain first connection relationships by inheriting, by the first aggregated node, the connection relationships of the plurality of first nodes, and adjust the connection relationships of the plurality of nodes; and determine the initial node coordinate of each node in the corresponding optimal node hierarchy based on the optimal node hierarchy corresponding to the first aggregated node, the optimal node hierarchy corresponding to the other node, and the first connection relationships.

11. The device according to claim 8, wherein, in response to a number of hierarchies for the first node hierarchy being multiple, the computer instructions causing the device to determine the initial node coordinate of each node in the corresponding optimal node hierarchy based on the optimal node hierarchy corresponding to each node and the connection relationships of the plurality of nodes further cause the device to:

obtain a second aggregated node by aggregating a plurality of second nodes at consecutive hierarchies in the first node hierarchy;

obtain second connection relationships by inheriting, by the second aggregated node, the connection relationships of the plurality of second nodes, and adjust the connection relationships of the plurality of nodes; and determine the initial node coordinate of each node in the corresponding optimal node hierarchy based on the optimal node hierarchy corresponding to the second aggregated node, the optimal node hierarchy corresponding to the other node, and the second connection relationships.

12. The device according to claim 8, wherein the computer instructions causing the device to obtain the first node whose node hierarchy is to be adjusted further cause the device to:

determine a candidate node hierarchy based on a number of nodes in each of a plurality of optimal node hierarchies, the candidate node hierarchy comprising more than one node; and obtain the first node whose node hierarchy is to be adjusted based on connection relationships between nodes in the candidate node hierarchy.

13. The device according to claim 12, wherein the computer instructions causing the device to obtain the first node whose node hierarchy is to be adjusted based on the connection relationships between the nodes in the candidate node hierarchy further cause the device to:

respectively determine a connection order between the nodes and initial node positions between the nodes in the candidate node hierarchy based on the connection relationships between the nodes in the candidate node hierarchy;

detect, in the candidate node hierarchy, whether a plurality of third nodes connected at a same hierarchy exist according to the connection order between the nodes;

in response to detecting that the plurality of third nodes connected at the same hierarchy exist, determine whether a first connection relationship between the initial node positions of the plurality of third nodes exists according to the initial node positions of the plurality of third nodes, the first connection relationship being a connection relationship overlapping lines between the plurality of third nodes; and in response to determining that the first connection relationship between the initial node positions of the plurality of third nodes exists, determine a fourth node between the plurality of third nodes as the first node whose node hierarchy is to be adjusted.

14. The device according to claim 13, wherein the computer instructions causing the device to obtain the first node whose node hierarchy is to be adjusted based on the connection relationships between nodes in the candidate node hierarchy further cause the device to:

in response to determining that the first connection relationship between the initial node positions of the plurality of third nodes does not exist, determine that the first node whose node hierarchy is to be adjusted in the candidate node hierarchy does not exist.

15. A non-transitory computer-readable storage medium, wherein the computer-readable storage medium stores computer instructions, and the computer instructions are configured to cause a computer to:

obtain graph data to be used for directed graph layout, the graph data comprising a plurality of nodes and connection relationships of the plurality of nodes;

respectively determine an optimal node hierarchy corresponding to each node based on the connection relationships of the plurality of nodes;

obtain a first node whose node hierarchy is to be adjusted and a first node hierarchy corresponding to the first node, and determine the first node hierarchy as the optimal node hierarchy corresponding to the first node, wherein the first node and the first node hierarchy are associated with a layout requirement specified by a user, and the layout requirement indicates that the first node needs to be allocated to the first node hierarchy;

determine a first directed layout graph of the graph data based on the first node hierarchy corresponding to the first node and an optimal node hierarchy corresponding to another node; and display the first directed layout graph by drawing the plurality of nodes and edges of the plurality of nodes according to the layout requirement specified by the user, wherein the computer instructions causing the computer to determine the first directed layout graph of the graph data based on the first node hierarchy corresponding to the first node and the optimal node hierarchy corresponding to the other node further cause the computer to:

detect whether the optimal node hierarchy corresponding to the other node is the same as the first node hierarchy;

in response to the optimal node hierarchy corresponding to the other node being the same as the first node hierarchy, determine a next node hierarchy of the first node hierarchy as the optimal node hierarchy corresponding to the other node;

determine an initial node coordinate of each node in a corresponding optimal node hierarchy based on the optimal node hierarchy corresponding to each node and the connection relationships of the plurality of nodes;

determine an order of nodes in each node hierarchy by using a weighted function and a local replacement iterative heuristic algorithm based on the initial node coordinate of each node;

adjust the initial node coordinate of each node by constructing and sorting an auxiliary graph based on the optimal node hierarchy corresponding to each node and the order of nodes in each node hierarchy, to obtain an optimal node coordinate of each node; and draw the edges of the plurality of nodes based on the order of nodes in each node hierarchy, the optimal node coordinate of each node, and the connection relationships of the plurality of nodes, to obtain the first directed layout graph.

16. The medium according to claim 15, wherein the computer instructions causing the computer to obtain the first node whose node hierarchy is to be adjusted and the first node hierarchy corresponding to the first node, and determine the first node hierarchy as the optimal node hierarchy corresponding to the first node further cause the computer to:

determine the first node whose node hierarchy is to be adjusted from the plurality of nodes according to a received hierarchy adjustment instruction, the hierarchy adjustment instruction being used for switching the optimal node hierarchy corresponding to the first node; and switch the optimal node hierarchy corresponding to the first node to the first node hierarchy, in response to receiving the hierarchy adjustment instruction.

17. The medium according to claim 15, wherein the computer instructions causing the computer to determine the initial node coordinate of each node in the corresponding optimal node hierarchy based on the optimal node hierarchy corresponding to each node and the connection relationships of the plurality of nodes further cause the computer to:

obtain a first aggregated node by aggregating a plurality of first nodes at a same hierarchy in the first node hierarchy;

obtain first connection relationships by inheriting, by the first aggregated node, the connection relationships of the plurality of first nodes, and adjust the connection relationships of the plurality of nodes; and determine the initial node coordinate of each node in the corresponding optimal node hierarchy based on the optimal node hierarchy corresponding to the first aggregated node, the optimal node hierarchy corresponding to the other node, and the first connection relationships.

* * * * *